United States Patent

Antonen

[15] 3,691,256
[45] Sept. 12, 1972

[54] ACETOXY FUNCTIONAL COPOLYMER COMPOSED OF MONOMETHYLSILOXANE UNITS AND DIPHENYLSILOXANE UNITS

[72] Inventor: Robert C. Antonen, Midland, Mich.

[73] Assignee: Dow Corning Corporation, Midland, Mich.

[22] Filed: Oct. 27, 1970

[21] Appl. No.: 84,487

Related U.S. Application Data

[62] Division of Ser. No. 802,196, Feb. 25, 1969, Pat. No. 3,632,793.

[52] U.S. Cl............260/825, 117/161 ZA, 161/193, 260/33.6 SB, 260/46.5 R, 260/46.5 G, 260/448.2 R, 260/448.8 R
[51] Int. Cl.....C08g 47/02, C08g 31/12, C08g 31/32
[58] Field of Search.........................260/825, 46.5 R

[56] References Cited

UNITED STATES PATENTS

| | | |
|---|---|---|
| 3,632,794 | 1/1972 | Antonen....................260/825 |
| 3,440,206 | 4/1969 | Pande et al................260/825 |
| 3,356,758 | 12/1967 | Omietanski et al.......260/46.5 |
| 3,145,225 | 8/1964 | Brown.....................260/46.5 |
| 3,294,718 | 12/1966 | Antonen....................260/825 |
| 2,486,162 | 10/1949 | Hyde.......................260/46.5 |

*Primary Examiner*—Samuel H. Blech
*Attorney*—Robert F. Fleming, Jr., Laurence R. Hobey and Harry D. Dingman

[57] ABSTRACT

Acetoxymonomethylsiloxane-diphenylsiloxane co-polymers of

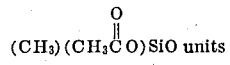

(CH₃)(CH₃CO)SiO units $CH_3SiO_{1.5}$ units, $(C_6H_5)_2SiO$ units and

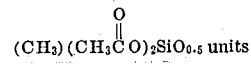

(CH₃)(CH₃CO)₂SiO₀.₅ units where the $(C_6H_5)_2SiO$ units are bonded to

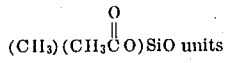

(CH₃)(CH₃CO)SiO units $CH_3SiO_{1.5}$ units or

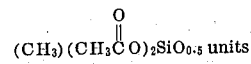

(CH₃)(CH₃CO)₂SiO₀.₅ units 15 to 46 weight percent of the copolymer is

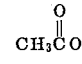

CH₃CO and 20 to 50 mol percent of the siloxane units are $(C_6H_5)SiO$ units is disclosed. Also disclosed are modified acetoxymonomethylsiloxane-diphenylsiloxane copolymers wherein molecules of the copolymer are linked together by segments of the formula

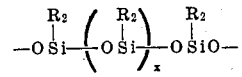

wherein $x$ is at least 2 and R is methyl, phenyl or 3,3,3-trifluoropropyl and the segments being present in amounts of 1 to 50 weight percent. The copolymers and modified copolymers are useful as cross-linkers, intermediates and laminating resins.

5 Claims, No Drawings

ACETOXY FUNCTIONAL COPOLYMER COMPOSED OF MONOMETHYLSILOXANE UNITS AND DIPHENYLSILOXANE UNITS

This is a division of application Ser. No. 802,196, filed Feb. 25, 1969, now U.S. Pat. No. 3,632,7930.

This invention relates to resinous organosiloxane copolymers having acetoxy functionality. More particularly, this invention relates to copolymers of monomethylsiloxane units and diphenylsiloxane units having acetoxy functionality on the monomethylsiloxane units wherein each of the diphenylsiloxane units is bonded to monomethylsiloxane units.

Organosiloxane copolymers are well known to the art, in a broad sense, such as those described in U.S. Pat. No. 2,486,162, issued to James Franklin Hyde on Oct. 25, 1949. Hyde describes the preparation of organosiloxane copolymers by hydrolyzing mixtures of organosilanes, such as the chlorosilanes. Hyde describes 14 classes of copolymers which include all the possible combinations which can be made from $SiO_2$ units, $R'SiO_{1.5}$ units, $R'SiO$ units and $R'SiO_{0.5}$ units where R' is an organic radical. Hyde's organosiloxane copolymers range from dimers, to fluids, to solids, to resins, to insoluble gels. Hyde is thus a comprehensive work which teaches a broad spectrum of organosiloxane copolymers. However, Hyde teaches only copolymers which are the hydrolyzed products of hydrolyzable silanes.

Acyloxy functional organosiloxane polymers and copolymers are known in the art. An example of acyloxy functional organosiloxane copolymers is described in U.S. Pat. No. 2,934,519 issued to Harold A. Clark on Apr. 26, 1960. In this patent Clark teaches that an acyloxy functional organosiloxane copolymer which rapidly cures in air at room temperature to a useful coating. Clark's acyloxy functional organosiloxane copolymer is a mixture of two hydroxylated organosiloxane copolymers containing some phenyl radicals on the silicon atoms wherein the hydroxyl groups have been replaced by residue from reaction with $R''Si(OZ)_3$ where R'' is a monovalent hydrocarbon of less than four carbon atoms and Z is an acyl radical or less than four carbon atoms. Clark's patent uses methyltriacetoxysilane as one of his acyloxysilanes. The acetoxy functional organosiloxane copolymers described in Clark's patent cure in air at room temperature in 24 hours or less. The acetoxymonomethylsiloxane-diphenylsiloxane copolymers of the present invention have significantly different properties from the Clark copolymers. For instance, the acetoxymonomethylsiloxane-diphenylsiloxane copolymers of the present invention do not cure in air at room temperature to useful coatings or films but remain soft and tacky even after periods of time exceeding 24 hours.

Clark is another patent, U.S. Pat. No. 3,032,529, issued on May 1, 1962, describes another acyloxy functional organosiloxane copolymer. Clark in this patent teaches that a hydroxylated organosiloxane resin is reacted with a diorganodiacyloxysilane to replace all the hydroxyl functionality by acyloxy functionality. This acyloxy functional organosiloxane copolymer differs substantially from the acetoxymonomethylsiloxane-diphenylsiloxane copolymer of the present invention which will become apparent from the description of the invention disclosed herein.

The present invention relates to an acetoxymonomethylsiloxane-diphenylsiloxane copolymer consisting essentially of organosiloxane units selected from the group consisting of

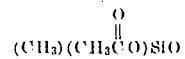

$(C_6H_5)_2SiO$ and

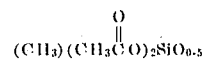

there being present per molecule at least 2 units of

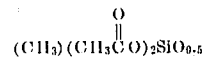

and at least one unit of $(C_6H_5)_2SiO$, at least 95 percent of the total number of $(C_6H_5)_2SiO$ units having each unsatisfied valence of each $(C_6H_5)_2SiO$ unit satisfied by a unit selected from the group consisting of

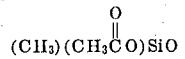

$CH_3SiO_{1.5}$ and

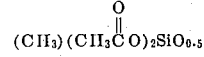

there being from 15 to 46 inclusive weight percent

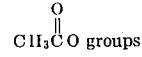 groups present in said acetoxymonomethylsiloxane-diphenylsiloxane copolymer based on the total weight of said acetoxymonomethylsiloxane-diphenylsiloxane copolymer and from 20 to 50 inclusive mol percent $(C_6H_5)_2SiO$ units based on the total number of siloxane units in said acetoxymonomethylsiloxane-diphenylsiloxane copolymer.

The present invention also relates to a modified acetoxymonomethylsiloxane-diphenylsiloxane copolymer consisting essentially of the acetoxymonomethylsiloxane-diphenylsiloxane copolymer defined above wherein acteoxymonomethylsiloxane-diphenylsiloxane copolymer molecules are linked together with segments consisting essentially of a diorganosiloxane of the formula

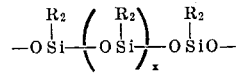

where each R is a monovalent radical selected from the group consisting of a methyl radical, a phenyl radical and a 3,3,3-trifluoropropyl radical, and x has an average value of at least 2, no more than 50 percent of the total number of R radicals being a monovalent radical selected from the group consisting of phenyl radicals and 3,3,3-trifluoropropyl radicals, the terminal oxygen atoms of the segments being substituted for

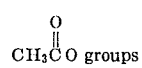 groups of the acetoxymonomethylsiloxane-diphenylsiloxane copolymer and said segments being present in an amount of from 1 to 50 weight percent based on the total weight of the modified acetoxymonomethylsiloxane-diphenylsiloxane copolymer.

The acetoxymonomethylsiloxane-diphenylsiloxane copolymer of the present invention is composed of two basic organosiloxane units, namely, monomethylsiloxane units and diphenylsiloxane units. The diphenylsiloxane units, for all practical purposes, are surrounded by monomethylsiloxane units. By this it is to be understood that the diphenylsiloxane unit will be present in one of the following structural arrangements:

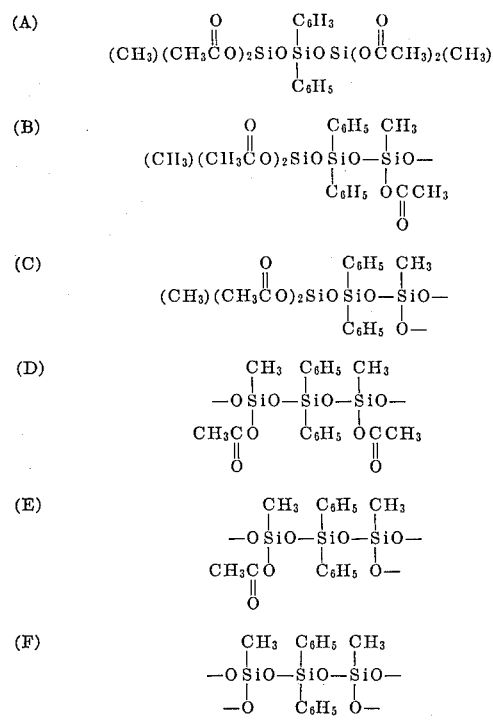

Any other structural arrangement involving the diphenylsiloxane unit and its two bonded adjacent neighboring units will be present in small percentages, such as wherein one or both of the two bonded adjacent neighboring units are other diphenylsiloxane units. Small percentages refers to 5 mol percent or less. Thus, the acetoxymonomethylsiloxane-diphenylsiloxane copolymer has at least 95 percent of the total number of $(C_6H_5)_2SiO$ units having each unsatisfied valance of each $(C_6H_5)_2SiO$ satisfied by

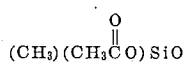

$CH_3SiO_{1.5}$ or

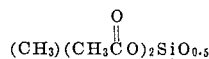

The number of diphenylsiloxane units bonded to $CH_3SiO_{1.5}$ units will be present, for the most part, in smaller percentages than the diphenylsiloxane units bonded to monomethylsiloxane units having acetoxy groups thereon, since the acetoxymonomethylsiloxane-diphenylsiloxane copolymer has a high percentage of acetoxy.

The best method for preparing the acetoxymonomethylsiloxane-diphenylsiloxane copolymer of the present invention is to mix the methyltriacetoxysilane and diphenylsilanediol at room temperature whereby an exotherm will be observed, preferably the diphenylsilanediol is added to the methyltriacetoxysilane. The desired molar ratio of monomethylsiloxane to diphenylsiloxane in the acetoxymonomethylsiloxane-diphenylsiloxane copolymer is determined prior to mixing and the corresponding molar ratio of diphenylsilanediol and methyltriacetoxysilane are then mixed. It is unnecessary to use a solvent or to heat the mixture since the reaction proceeds exothermally at room temperature and goes to completion in a short period of time, such as from 15 minutes to an hour. The reaction produces acetic acid as a by-product and this is then stripped from the acetoxymonomethylsiloxane-diphenylsiloxane copolymer by heating the mixture under reduced pressure.

The basic procedure may be modified in several ways to obtain the same acetoxymonomethylsiloxane-diphenylsiloxane copolymer. One such method is as follows. An acetoxymonomethylsiloxane-diphenylsiloxane copolymer containing 43 mol percent diphenylsiloxane units can be made by adding 3 moles of diphenylsilanediol to 4 moles of methyltriacetoxysilane. The same acetoxymonomethylsiloxane-diphenylsiloxane copoylmer can also be made by adding 1 mole of diphenylsilanediol to 2 moles of methyltriacetoxysilane to produce an acetoxymonomethylsiloxane-diphenylsiloxane copolymer which can be represented by formula (A) above. To the acetoxymonomethylsiloxane-diphenylsiloxane copolymer of formula (A), 0.5 mole of diphenylsilanediol is then added per mole of the acetoxymonomethylsiloxane-diphenylsiloxane copolymer and the resulting product can be represented by the formula

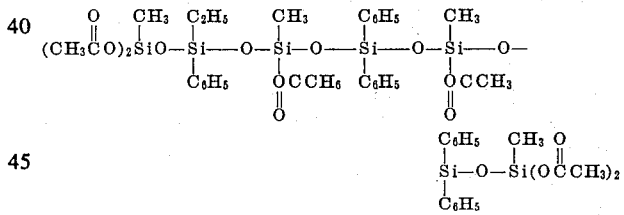

Higher molecular weight copolymers can be made, for example, wherein the molecular weight is approximately doubled, by adding an increment 0.5 mole of diphenylsilanediol per mole of starting acetoxymonomethylsiloxane-diphenylsiloxane copolymer. Other increments of diphenylsilanediol can be used with corresponding results which are readily apparent to those skilled in the art.

The above methods can be used to prepare acetoxymonomethylsiloxane-diphenylsiloxane copolymers of this invention wherein the mol percentage of diphenylsiloxane units in the acetoxymonomethylsiloxane-diphenylsiloxane copolymer is from 33.3 to 50 percent. Since one molecule of diphenylsilanediol can react with no more than two moles of methyltriacetoxysilane, the lowest mol percentage of diphenylsilanediol usable in the above methods for the preparation of the acetoxymonomethylsiloxane-diphenylsiloxane copolymer is 33.3 percent. Decreasing the mol percentage of the diphenylsilanediol further would still produce the same acetoxymonomethylsiloxane-diphenylsiloxane copolymer as defined by formula (A) and leave unreacted methyltriacetoxysilane which would form a mixture.

To make acetoxymonomethylsiloxane-diphenylsiloxane copolymers having from 20 to 33.3 mol percent diphenylsiloxane units, the best procedure is as follows. Prior to adding the diphenylsilanediol to the methyltriacetoxysilane, a calculated amount of water is added to the methyltriacetoxysilane to hydrolyze a desired number of the acetoxy groups and condense the resulting silanols to form a siloxane bond. For example, if 1 mole of water is added to 2 moles of methyltriacetoxysilane, the resulting product would be essentially a dimer, such as illustrated by the following equation:

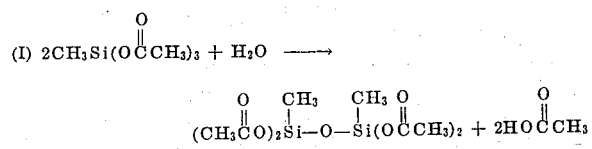

It is to be understood that the above equation is illustrative only for the idealized situation and that the final product would be a mixture of products which would average out to this formula. However, when water is slowly added to the methyltriacetoxysilane, the results are essentially as shown by equation (I).

When 1 mole of diphenylsilanediol is added to 4 moles of methyltriacetoxysilane which has first been treated in the manner of equation (I), the final product will be 20 mol percent diphenylsiloxane and 46 weight percent acetoxy, and the average formula can be illustrated as follows:

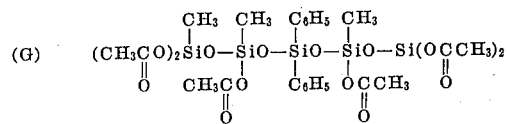

If the molar ratio of water to methyltriacetoxysilane is less than 1:2, the amount of diphenylsiloxane in the acetoxymonomethylsiloxane-diphenylsiloxane copolymer can be varied accordingly between 20 and 33.3 mol percent when the methyltriacetoxysilane is first treated with water. Further, the amount of diphenylsiloxane in the copolymer can be increased by adding diphenylsilanediol to the copolymer (G) described above.

The molecular weight of the actoxymonomethylsiloxane-diphenylsiloxane copolymers can be increased by adding defined amounts of water to them to hydrolyze and condense a calculated amount of acetoxy groups. One mole of water will hydrolyze 2 moles of acetoxy groups and the resulting silanols will condense to produce one mole of ≡ Si—O—Si ≡ , for example.

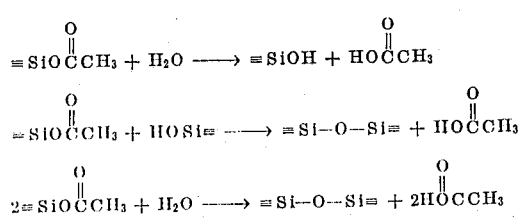

To illustrate increasing the molecular weight, 1 mole of water can be added for each 4 moles of acetoxy in the acetoxymonomethylsiloxane-diphenylsiloxane copolymer of formula (A). the resulting product has the same mol percentage of diphenylsiloxane, but a higher molecular weight. The following equation can be used to illustrate the procedure

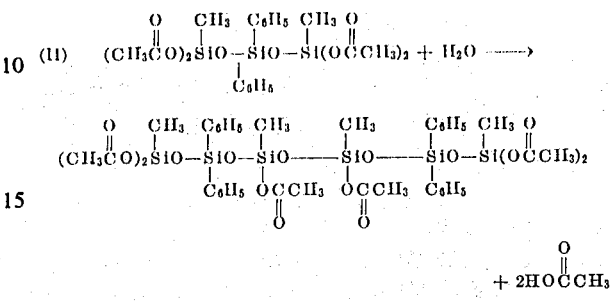

The procedures described above for preparing the acetoxymonomethylsiloxane-diphenylsiloxane copolymers can be used as long as the described limits are met. The percentage of diphenylsiloxane in the acetoxymonomethylsiloxane-diphenylsiloxane copolymer can vary from 20 to 50 inclusive mol percent based on the total number of moles or organosiloxane units in the acetoxymonomethylsiloxane-diphenylsiloxane units in the acetoxymonomethylsiloxane-diphenylsiloxane copolymer. The amount of acetoxy is to be maintained between 15 and 46 weight percent based on the total weight of the copolymer. The most preferred copolymers are those having from about 18 weight percent acetoxy or above, since the amount of acetoxy for a linear structure having the repeating unit

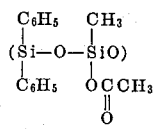

is 18.7 weight percent acetoxy.

The acetoxymonomethylsiloxane-diphenylsiloxane copolymers described above can be modified by linking molecules of the acetoxymonomethylsiloxane-diphenylsiloxane copolymer together with diorganosiloxane segments of the formula

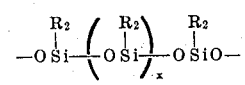

where $x$ is at least 2, preferably 2 to 1,000, and each R is a methyl radical, a phenyl radical or a 3,3,3-trifluoropropyl radical. No more than 50 percent of the R radicals are phenyl or 3,3,3-trifluoropropyl. The segments can be present in an amount of from 1 to 50 weight percent.

The acetoxymonomethylsiloxane-diphenylsiloxane copolymers can best be modified by mixing the acetoxymonomethylsiloxane-diphenylsiloxane copolymer with a diorganosiloxane polymer which is hydroxyl endblocked and thereafter heating the mixture. The diorganosiloxane polymers which are hydroxyl endblocked can be represented by the formula $$HO(R_2SiO)_xH$$

wherein R and x are defined above. Examples of these hydroxyl endblocked diorganosiloxane polymers include among others polydimethylsiloxane, polyphenylmethylsiloxane, poly3,3,3-trifluoropropylmethylsiloxane, mixtures thereof and hydroxyl endblocked copolymers containing two or more units of a dimethylsiloxane unit, a phenylmethylsiloxane unit, a diphenylsiloxane unit or a 3,3,3-trifluoropropylmethylsiloxane unit.

The hydroxyl endblocked diorganosiloxane polymer can be mixed with the acetoxymonomethylsiloxane-diphenylsiloxane copolymer in the presence of an inert organic solvent for the polymers such as toluene, xylene, and the like. The mixture is preferably heated from room temperature to 150°C. for 30 minutes up to about 5 hours, usually 1 to 2 hours is sufficient to achieve complete reaction. If desired catalyst known for the silanol-acetoxy reaction can be used, however, the reaction proceeds satisfactorily without such a catalyst. The acetic acid by-product can be removed by heating under reduced pressure. The resulting product can be illustrated as follows:

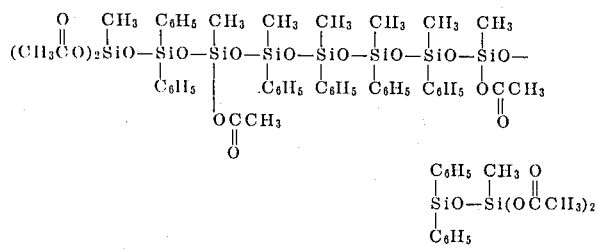

where the structure shows the average formula for the reaction product of a mixture of acetoxymonomethylsiloxane-diphenylsiloxane copolymer (A) and

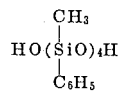

in the molar ratio of 2 to 1 or where the

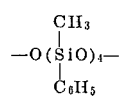

is present in 41.6 weight percent.

The acetoxymonomethylsiloxane-diphenylsiloxane copolymers of the present invention are useful as crosslinkers in preparing elastomers, as a coupling agent and they are particularly useful as intermediates in preparing protective coatings, laminates, release coatings, and molding compositions. When used as intermediates, the acetoxymonomethylsiloxane-diphenylsiloxane copolymers are hydrolyzed and the resulting hydroxyl containing copolymer can be used as a laminating resin, a molding compound or a coating resin. The modified acetoxymonomethylsiloxane-diphenylsiloxanes are particularly useful in preparing the release coatings and the protective coatings when they are hydrolyzed to provide a hydroxyl containing resin. The modified acetoxymonomethylsiloxane-diphenylsiloxane copolymers which are best suited to prepare release coatings are those containing 1 to 10 weight percent polydimethylsiloxane segments of 4 to 100 siloxane units, thus x is 2 to 98. The modified acetoxymonomethylsiloxane-diphenylsiloxane copolymers which are best suited to prepare protective coatings are those which contain 15 to 30 weight percent of polydimethylsiloxane segments of 4 to 100 siloxane units, thus x is 2 to 98.

The following examples are illustrative only and should not be construed as limiting the present invention which is properly delineated in the claims.

EXAMPLE 1

A flask equipped with a stirrer and a thermometer was charged with 586 g. (2.66 moles) of methyltriacetoxysilane and agitation was started prior to the addition of 290 g. (1.34 mole) of diphenylsilanediol. The addition time for the diphenylsilanediol was 4 minutes. The temperature of the mixture increased from 25° to 60°C. from the exothermic reaction. The agitation was continued for 30 minutes at which time the contents of the flask had cleared. The product was then vacuum stripped to 146°C. at 36 mm of Hg to remove the by-produced acetic acid. The product had 44.0 weight percent acetoxy groups, no detectable ≡SiOH, a ≡ $SiC_6H_5$ to ≡ $SiCH_3$ ratio of 1:1 and a

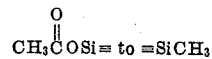

ratio of 2:1 which is consistent with the following structural formula wherein the theory acetoxy is 44.0 weight percent:

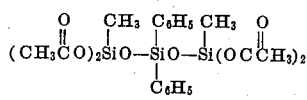

The product would not cure when a film was exposed to air overnight but cured to a hard, slightly flexible film when heated at 232° C. for 2 hr.

EXAMPLE 2

A flask equipped with a stirrer and a thermometer was charged with 586 g. (2.66 moles) of methyltriacetoxysilane and agitation was started prior to the addition of 290 g. (1.34 moles) of diphenylsilanediol. The addition time of the diphenylsilanediol was less than 1 minute. The temperature of the mixture increased from 25° to 76°C. from the exothermic reaction. The agitation was continued for 2 hours and then the product was vacuum stripped to 78°C. at 22 mm of Hg. After the product was stripped an additional 145 g. (0.67 mole) of diphenylsilanediol was added. The mixture was then agitated for 30 minutes. The reaction product was then vacuum stripped to 74°C. at 23 mm of Hg. The product was clear and contained 32.5 weight percent acetoxy groups and no detectable ≡SiOH. The product was an acetoxymonomethylsiloxane-diphenylsiloxane copolymer of 57 mol percent monomethylsiloxane units and 43 mol percent diphenylsiloxane units with the acetoxy groups attached to the silicon atoms of the monomethylsiloxane units. A coating of the acetoxymonomethylsiloxane-diphenylsiloxane copolymer remained soft and tacky and did not cure after being exposed to the atmosphere for 4 days at room temperature. The coating required two weeks to form a skin on the surface, but cured to a hard film when heated to 227°C. for 10 minutes.

A solution of the acetoxymonomethylsiloxane-diphenylsiloxane copolymer was made by blending 600 g. of the acetoxymonomethylsiloxane-diphenylsiloxane copolymer with 900 g. of toluene. The resulting solution was added to 1,500 g. of water. After agitating the resulting mixture for 30 minutes at about 48°C., the aqueous layer containing acetic acid was separated from the monomethylsiloxane-diphenylsiloxane copolymer layer by decanting. The monomethylsiloxane-diphenylsiloxane copolymer layer was then washed three times with hot water, the wash water was removed by decanting and the monomethylsiloxane-diphenylsiloxane copolymer layer was azeotroped to remove the residual water. The hydrolyzed acetoxymonomethylsiloxane-diphenylsiloxane copolymer was 5.71 weight percent silanol ( = SiOH) and had a 250°C. gel time of 7 minutes. The resulting monomethylsiloxane-diphenylsiloxane copolymer was used to prepare a glass-resin laminate by a conventional technique wherein the cured laminate had a flexual strength of 48,600 p.s.i. at room temperature.

EXAMPLE 3

To 290 g. (1.34 moles) of diphenylsilanediol, 586 g. (2.66 moles) of methyltriacetoxysilane was added while agitating the diphenylsilanediol. The mixture increased in temperature from 25° to 74° C. during the addition. The mixture was agitated for 2 hours and then vacuum stripped to 75 ° C. at 24 mm of Hg. The product was a clear liquid.

An additional 145 g. (0.67 mole) of diphenylsilanediol was then added to the above product and agitation was continued for 15 minutes. A clear product resulted after vacuum stripping to 75 ° C. at 22 mm of Hg. To this reaction mixture, an additional 72.5 g. (0.335 mole) of diphenylsilanediol was added and the mixture was then agitated for 15 minutes. After vacuum stripping to 72 ° C. at 24 mm of Hg., a clear product resulted which was an acetoxymonomethylsiloxane-diphenylsiloxane copolymer containing 46.8 mol percent diphenylsiloxane units and 53.2 percent monomethylsiloxane units having 27.5 weight percent acetoxy groups bonded to the silicon atoms of the monomethylsiloxane units. There was no detectable silicon-bonded hydroxyl groups in the acetoxymonomethylsiloxane-diphenylsiloxane copolymer.

EXAMPLE 4

To 220 g. (1.0 mole) of methyltriacetoxysilane, 9.0 g. (0.5 mole) of water was added dropwise over a 4 minute period. The temperature increased from 23° to 61° C. during the addition. The mixture was then stirred for 40 minutes. To this resulting reaction product, 54 g. (0.25 mole) of diphenylsilanediol was added and stirred for 2.25 hours. The temperature increased during the addition from 36° to 43° C. The resulting product was vacuum stripped to 105° C. at 25 mm of Hg. The amount of acetic acid removed was 95 g. (theoretical 90 g.). The product was an acetoxy monomethylsiloxane-diphenylsiloxane copoylmer having 80 mol percent monomethylsiloxane units and 20 mol percent diphenylsiloxane units.

EXAMPLE 5 54 g. (0.25 mole) of diphenylsilanediol was added.

To 220 g. (1.0 mole) of methyltriacetoxysilane, 9.0 g. (0.5 mole) of water was added dropwise with agitation over a 10 minute period. The temperature increased from 26° to 60° C. during the addition. The agitation was continued for an additional 10 minutes. To this reaction mixture, 54 g. (0.25 mole) of diphenylsilanediol was added over a 2 minute period. Agitation was continued during the addition and for 40 minutes thereafter. The temperature increased from 42° to 50° C. during the addition. The resulting product was vacuum stripped to 95°C. at 17 mm of Hg. whereby 92.52 g. of acetic acid was recovered (theoretical 90 g.). To the stripped product was 91° C., 27 g. (0.125 mole) of diphenylsilanediol was added and the mixture was agitated for 30 minutes. The resulting product was vacuum stripped to 95 ° C. at 17 mm of Hg whereby 10.48 g. of acetic acid was recovered (theoretical 12.48 g.). The product was an acetoxymonomethylsiloxane-diphenylsiloxane copolymer having 27.25 mol percent diphenylsiloxane units and 72.75 mole percent monomethylsiloxane units wherein the acetoxy groups are bonded to the silicon atoms of the monomethylsiloxane units. The acetoxymonomethylsiloxane-diphenylsiloxane copolymer was 35.1 weight percent acetoxy (theoretical 36.9 weight percent).

EXAMPLE 6

(A) To a flask containing 220 g. (1 mole) of methyltriacetoxysilane, 108 g. (0.5 mole) of diphenylsilanediol was added while the methyltriacetoxysilane was being agitated. The temperature increased from 25° to 82° C. during the addition. The mixture was stirred for 30 minutes. The resulting mixture was then vacuum stripped to 87 ° C. at 12 mm of Hg whereby 61 g. of acetic acid was collected (theory 60 g.). The resulting product was an acetoxymonomethylsiloxane-diphenylsiloxane copolymer of 33.3 mol percent diphenylsiloxane units and 66.7 mol percent monomethylsiloxane units with the acetoxy groups attached to the silicon atoms of the monomethylsiloxane units. The acetoxymonomethylsiloxane-diphenylsiloxane copolymer had an average molecular weight of 536.

(B) To the above acetoxymonomethylsiloxane-diphenylsiloxane copolymer at 87° C., 54 g. (0.25 mole) of diphenylsilanediol was added. The resulting mixture was stirred for 14 minutes and then vacuum stripped to 87°C. at 14 mm of Hg whereby additional acetic acid was collected to provide a total of 95.5 g. (theory 90 g.). The resulting product was an acetoxymonomethylsiloxane-diphenylsiloxane copolymer of 42.9 mol percent diphenylsiloxane units and 57.1 mol percent monomethysiloxane units with the acetoxy groups attached to the silicon atoms of the monomethylsiloxane units. The acetoxymonomethylsiloxane-diphenylsiloxane copolymer had an average molecular weight of 1,200.

(C) To the acetoxymonomethylsiloxane-diphenylsiloxane copolymer produced in (B) at a temperature of 81° C., 27 g. (0.125 mole) of diphenylsilanediol was added. The resulting mixture was stirred for 16 minutes and then vacuum stripped to 72° C. at 12 mm of Hg whereby additional acetic acid was collected to provide a total of 106.5 g. (theory 105 g.). The resulting product was an acetoxymonomethylsiloxane-diphenylsiloxane copolymer of 46.6 mol percent diphenylsiloxane units and 53.4 mol percent monomethylsiloxane units with the acetoxy groups attached to the silicon atoms of the monomethylsiloxane units. The acetoxymonomethylsiloxane diphenylsiloxane copolymer had an average molecular weight of about 2400.

(D) To the acetoxymonomethylsiloxane-diphenylsiloxane copolymer produced in (C) at 68° C., 13.5 g. (0.0625 mole) of diphenylsilanediol was added. The mixture was stirred with vacuum stripping started immediately after the addition of the diphenylsilanediol. The vacuum stripping was continued for 31 minutes at 80° C. at 12 mm of Hg whereby additional acetic acid was collected to provide a total of 118.0 g. (theory 112.5 g.). The resulting product was an acetoxymonomethylsiloxane-diphenylsiloxane copolymer of 48.4 mol percent diphenylsiloxane units and 51.6 mol percent monomethylsiloxane units with the acetoxy groups attached to the silicon atoms of the monomethylsiloxane units. The acetoxymonomethylsiloxane-diphenysiloxane copolymer had an average molecular weight or about 5,000.

(E) To the acetoxymonomethylsiloxane-diphenylsiloxane copolymer produced in (D) at 72° C., 6.75 g. (0.03125 mole) of diphenylsilanediol was added. The mixture was stirred 10 minutes and then vacuum stripped to 78° C. at 12 mm of Hg whereby additional acetic acid was collected to provide a total of 121.25 g. (theory 116.25 g.). The resulting product was an acetoxymonomethylsiloxane-diphenylsiloxane copolymer of 49.2 mol percent diphenylsiloxane units and 50.8 mol percent monomethylsiloxane units with the acetoxy groups attached to the silicon atoms of the monomethylsiloxane units. The acetoxy monomethylsiloxane-diphenylsiloxane copolymer had an average molecular weight of about 10,000.

(F) To the acetoxymonomethylsiloxane-diphenyl siloxane copolymer produced in (E) at 75° C., 3.38 g. (0.0156 mole) of diphenysilanediol was added. The mixture was stirred for 3 minutes and then vacuum stripped to 85° C. at 12 mm of Hg whereby additional acetic acid was collected to provide a total of 124.13 g. (theory 118.13 g.). The resulting product was an acetoxymonomethylsiloxane-diphenylsiloxane copolymer of 49.6 mol percent of diphenylsiloxane units and 50.4 mol percent of monomethylsiloxane units with the acetoxy groups attached to the silicon atoms of the monomethylsiloxane units. The acetoxymonomethylsiloxane-diphenylsiloxane copolymer had an average molecular weight of about 20.000.

(G) To the acetoxymonomethylsiloxane-diphenylsiloxane copolymer produced in (F) 1.69 g. (0.0078 mole) of diphenylsilanediol was added. The mixture was stirred and vacuum stripped immediately to 87° C. at 12 mm of Hg whereby additional acetic acid was collected to provide a total of 125.92 g. (theory 119.06 g.). The resulting product was an acetoxymonomethylsiloxane-diphenylsiloxane copolymer of 49.80 mol percent diphenylsiloxane units and 50.20 mol percent monomethylsiloxane units with the acetoxy groups attached to the silicon atoms of the monomethylsiloxane units. The acetoxymonomethylsiloxane-diphenylsiloxane copolymer had an average molecular weight of about 40,000.

(H) To the acetoxymonomethylsiloxane-diphenylsiloxane copolymer produced in (G), 0.85 g. (0.0039 mole) of diphenylsilanediol was added. The mixture was stirred for 15 minutes and then vacuum stripped to 87° C. at 12 mm of Hg. The resulting produce was an acetoxymonomethylsiloxane-diphenylsiloxane copolymer of 49.90 mol percent diphenylsiloxane units and 50.10 mol percent monomethylsiloxane units with the acetoxy groups attached to the silicon atoms of the monomethylsiloxane units. The acetoxymonomethylsiloxane-diphenylsiloxane copolymer had an average molecular weight of about 81,000.

(I) To the acetoxymonomethylsiloxane-diphenylsiloxane copolymer produced in (H) at 87° C., 0.42 g. (0.00195 mole) of diphenylsilanediol was added and then the mixture was stirred for 20 minutes. The resulting product was an acetoxymonomethylsiloxane-diphenylsiloxane copolymer of 49.95 mol percent diphenylsiloxane units and 50.05 mol percent of monomethylsiloxane units with the acetoxy groups attached to the silicon atoms of the monomethylsiloxane units. The acetoxymonomethylsiloxane-diphenylsiloxane copolymer had an average molecular weight of about 162,000.

(J) To the acetoxymonomethylsiloxane-diphenylsiloxane copolymer produced in (I) at 75° C., 0.21 g. (0.00098 mole) of diphenylsilanediol was added. The mixture was stirred for 5 minutes and then vacuum stripped to 105° C. at 12 mm of Hg whereby the total amount of acetic acid collected was 127.90 g. (theory 119.88 g.). The resulting product was an acetoxymonomethylsiloxane-diphenylsiloxane copolymer of 49.98 mol percent diphenylsiloxane units and 50.02 mol percent monomethylsiloxane units with the acetoxy groups attached to the silicon atoms of the monomethylsiloxane units. The acetoxymonomethylsiloxane-diphenylsiloxane copolymer had an average molecular weight of about 323,000. None of the above products cure in air at room temperature within a 24 hour period.

EXAMPLE 7

Nine grams (0.5 mole) of water was added to agitating methyltriacetoxysilane, 220 g. (1 mole), over a two minute period. The temperature increased from 25° to 63° C. during the addition. The mixture was stirred for 10 minutes and then 54 g. (0.25 mole) of diphenylsilanediol was added over a two minute period. The temperature increased from 45° C. to 53° C. during the addition. The mixture was stirred for 35 minutes. Thereafter, 2.25 g. (0.125 mole) of water was added to the mixture over a 2 minute period. The temperature increased from 37°to 43° C. during the addition. The mixture was stirred for 6 minutes and then 13.5 g. (0.0625 mole) of diphenylsilanediol was added to the mixture which was at 42° C. the mixture was stirred for 1 hour and 45 minutes and then was vacuum stripped to 111° C. at 12 mm of Hg whereby 115 g. (theory 112.5 g.) of acetic acid was collected. The resulting product was an acetoxymonomethylsiloxane-diphenylsiloxane copolymer of 23.8 mol percent diphenylsiloxane units and 76.2 mol percent monomethylsiloxane units with the acetoxy groups attached to the silicon atoms of the monomethylsiloxane units. The acetoxymonomethylsiloxane-diphenylsiloxane copolymer had 30.4 weight percent acetoxy groups and an average molecular weight of about 6200.

EXAMPLE 8

Nine grams (0.5 mole) of water was added dropwise to 220 g. (1.0 mole) of methyltriacetoxysilane. The mixture was stirred for 20 minutes. To the resulting mixture 54 g. (0.25 mole) of diphenylsilanediol was added and the mixture was stirred for 30 minutes. To this mixture, 27 g. (0.125 mole) of diphenylsilanediol was added. The mixture was stirred for 1 hour and then vacuum stripped to 120°C. at 12 mm of Hg whereby 111 g. (theory 105 g.) of acetic acid was collected. The resulting product was an acetoxymonomethylsiloxane-diphenylsiloxane copolymer of 27.3 mol percent diphenylsiloxane units and 72.7 mol percent monomethylsiloxane units with the acetoxy group attached to the silicon atoms of the monomethylsiloxane units.

EXAMPLE 9

To a flask, 330 g. (1.5 mole) of methyltriacetoxysilane was added and 324 g. (1.5 mole) of diphenylsilanediol was then added to the methyltriacetoxysilane over a 10 minute period. The mixture was agitated for 1 hour and then vacuum stripped to 132°C. at 40 mm of Hg whereby 170 g. (180 g. theory) of acetic acid was collected. The resulting product was a clear, colorless and viscous acetoxymonomethylsiloxane-diphenylsiloxane copolymer at room temperature. The acetoxymonomethylsiloxane-diphenylsiloxane copolymer was dissolved in 484 g. of dry toluene. The acetoxymonomethylsiloxane-diphenylsiloxane copolymer was 50 mol percent diphenylsiloxane units and 50 mol percent monomethylsiloxane units with the acetoxy groups attached to the silicon atoms of the monomethylsiloxane units. The acetoxymonomethylsiloxane-diphenylsiloxane copolymer was 18.67 weight percent acetoxy.

EXAMPLE 10

To 206 g. of the acetoxymonomethylsiloxane-diphenylsiloxane copolymer of Example 9, 17.9 g. of a hydroxyl endblocked polyphenylmethylsiloxane polymer having a cryoscopic molecular weight of 1025 and 60.6 g. of dry toluene were added. The mixture was stirred and heated at 65° to 80°C. for two hours and then stirred for 1.5 hour at room temperature and thereafter vacuum stripped to 142°C. at 42 mm of Hg whereby 152 g. of volatiles were collected. Ninety grams of dry toluene were added to the product which was clear and viscous. The resulting product was a modified acetoxymonomethylsiloxane-diphenylsiloxane copolymer having 15.92 weight percent acetoxy and wherein acetoxymonomethylsiloxane-diphenylsiloxane copolymer molecules of Example 9 were linked together by segments of polyphenylmethylsiloxane.

EXAMPLE 11

In a flask, 347.4 g. of the acetoxymonomethylsiloxane-diphenylsiloxane copolymer of Example 9 and 23.8 g. of a hydroxyl endblocked polyphenylmethylsiloxane polymer having an average molecular weight of 937 were mixed. The mixture was heated to 75° to 80°C. for 2 hours and then vacuum stripped to 112°C. at 6 mm of Hg for 30 minutes whereby 173.2 g. of volatiles were collected. The product was a modified acetoxymonomethylsiloxane-diphenylsiloxane copolymer which had a viscosity of 6.6 cs. at 25°C. at 48.9 percent solids in toluene. The percent solids were determined by placing a 3 gram sample in a tared aluminum cup, placing the cup in a 135°C. air circulating oven for 3 hours and then determining the amount of material left. Percent is given in weight percent. The modified acetoxymonomethylsiloxane-diphenylsiloxane copolymer had 16.36 weight percent acetoxy. The modified acetoxymonomethylsiloxane-diphenylsiloxane copolymer was a copolymer wherein acetoxymonomethylsiloxane-diphenylsiloxane copolymer molecules of Example 9 were linked together by segments of polyphenylmethylsiloxane.

EXAMPLE 12

To 990 g. (4.5 mole) of methyltriacetoxysilane, 972 g. (4.5 mole) of diphenylsilanediol were added over a 30 minute period. The mixture was stirred overnight at room temperature and then vacuum stripped for 30 minutes at 124°C. at 18 mm of Hg. The resulting product was an acetoxymonomethylsiloxane-diphenylsiloxane copolymer of 50 mol percent diphenylsiloxane units and 50 mol percent monomethylsiloxane units with the acetoxy groups attached to the silicon atoms of the monomethylsiloxane units. The acetoxymonomethylsiloxane-diphenylsiloxane copolymer had 19.87 weight percent acetoxy and when dissolved in 1,422 g. of toluene, the acetoxymonomethylsiloxane-diphenylsiloxane copolymer had a viscosity of 3.99 cs. at 25°C. at 47.3 weight percent solids.

To 711 g. of the above acetoxymonomethylsiloxane-diphenylsiloxane copolymer (toluene removed), 97 g. of a hydroxyl endblocked polyphenylmethylsiloxane having a cryoscropic molecular weight of 1,093 and 2.64 weight percent silicon bonded hydroxyl groups and a viscosity of 1,625 cs. at 25°C. was added and stirred at 82° to 85° for 1.75 hours. The mixture was then vacuum stripped to 127°C. at 18 mm of Hg whereby 5.3 g. of acetic acid was collected. The resulting product was diluted with 596.25 g. of toluene to provide a solution of a modified acetoxymonomethylsiloxane-diphenylsiloxane copolymer having 14.57 weight percent acetoxy groups wherein molecules of the acetoxymonomethylsiloxane-diphenylsiloxane copolymer were linked together by segments of polyphenylmethylsiloxane. The modified acetoxymonomethylsiloxane-diphenylsiloxane copolymer had a viscosity of 7.90 cs. at 25°C. at 53.9 weight percent solids in toluene.

EXAMPLE 13

To 376 g. (1.71 mole) of methyltriacetoxysilane, 259 g. (1.20 mole) of diphenylsilanediol was added over a 10 minute period. The mixture was stirred for 45 minutes and then vacuum stripped to 143°C. at 40 mm of Hg whereby 130 g. of acetic acid was collected. The resulting product was an acetoxymonomethylsiloxane-diphenylsiloxane copolymer of 41.0 mol percent diphenylsiloxane units and 59.0 mol percent monomethylsiloxane units with the acetoxy groups attached to silicon atoms of the monomethylsiloxane units. The acetoxymonomethylsiloxane-diphenylsiloxane copolymer was 32.2 weight percent acetoxy (theory 32.8 percent). The acetoxymonomethylsiloxane-diphenylsiloxane copolymer was dissolved in 491 g. of toluene.

To 298.5 g. (49.3 weight percent acetoxymonomethylsiloxane-diphenylsiloxane copolymer) of the above acetoxymonomethylsiloxane-diphenylsiloxane copolymer solution, 37.7 g. of a hydroxyl endblocked polyphenylmethylsiloxane having a cryoscopic molecular weight of 937 and 0.95 weight percent silicon bonded hydroxyl radicals was added and the resulting mixture was heated at 95°C. for 85 minutes. The resulting product was stripped to 120°C. at 10 mm of Hg whereby 158.1 g. of volatiles were collected. To the resulting product 107.7 g. of dry toluene were added to provide a solution of a modified acetoxymonomethylsiloxane-diphenylsiloxane copolymer of 25.75 weight percent acetoxy where molecules of the acetoxymonomethylsiloxane-diphenylsiloxane copolymer prepared above were linked together by segments of polyphenylmethylsiloxane. The polyphenylmethylsiloxane segments were about 21 weight percent of the total weight of the modified acetoxymonomethylsiloxane-diphenylsiloxane copolymer.

EXAMPLE 14

To 474 g. of the acetoxymonomethylsiloxane-diphenylsiloxane copolymer solution of Example 12, 96.9 g. of the hydroxyl endblocked polyphenylmethylsiloxane described in Example 13 was added and the mixture was heated at 92°C. for 1.25 hours. The resulting mixture was cooled and then vacuum stripped to 112°C. at 12 mm of Hg whereby 236.1 g. of volatiles were collected. The resulting product was a modified acetoxymonomethylsiloxane-diphenylsiloxane copolymer of 9.83 weight percent acetoxy where molecules of the acetoxymonomethylsiloxane-diphenylsiloxane copolymer of Example 12 were linked together by segments of polyphenylmethylsiloxane. The polyphenylmethylsiloxane segments were about 30 weight percent of the total weight of the modified acetoxymonomethylsiloxane-diphenylsiloxane copolymer. When the modified acetoxymonomethylsiloxane-diphenylsiloxane copolymer was dissolved in toluene to provide a 48 weight percent solution of polymer, the viscosity was 5.46 cs. at 25°C.

EXAMPLE 15

To 220 g. (1 mole) of methyltriacetoxysilane, 9 g. (0.5 mole) of water was added dropwise over a 3 minute period. The temperature increased from 25° to 68°C. during the addition. The mixture was agitated for 15 minutes and then 54 g. (0.25 mole) of diphenylsilanediol was added. The temperature increased from 50° to 56°C. during the addition. The mixture was agitated for 30 minutes and then vacuum stripped to 83°C. at 15 mm of Hg whereby 95 g. (theory acetic acid is 90 g.) volatiles was collected. An additional 27 g. (0.125 mole) of diphenylsilanediol was added at 85°C. and vacuum stripping was started immediately. The mixture was vacuum stripped to 100°C. at 14 mm of Hg whereby 19 g. (theory acetic acid is 15 g.) volatiles was collected. To the resulting acetoxymonomethylsiloxane-diphenylsiloxane copolymer having 72.7 mol percent monomethylsiloxane units and 27.3 mol percent diphenylsiloxane units with the acetoxy groups attached to the silicon atoms of the monomethylsiloxane units, 2.8 g. of a hydroxyl endblocked polydimethylsiloxane having an average of 41 dimethylsiloxane units per molecule was added at 75°C. and agitated for 15 minutes. The resulting mixture was then vacuum stripped to 176°C. at 14 mm of Hg whereby 1.8 g. of volatiles were collected. The resulting product was a modified acetoxymonomethylsiloxane-diphenylsiloxane copolymer wherein the acetoxymonomethylsiloxane-diphenylsiloxane copolymer was modified with polydimethylsiloxane segments linking acetoxymonomethylsiloxane-diphenylsiloxane copolymer molecules together. The polydimethylsiloxane segments were present in an amount of 1.35 weight percent based on the total weight of the modified acetoxymonomethylsiloxane-diphenylsiloxane copolymer.

EXAMPLE 16

To 660 g. (3.0 moles) of methyltriacetoxysilane, 324 g. (1.5 moles) of diphenylsilanediol was added. The temperature increased from room temperature to 65°C. during the addition. The mixture was stirred for 50 minutes and then vacuum stripped to 120°C. at 10 mm of Hg whereby 170 g. of volatiles were recovered. To the resulting product which was an acetoxymonomethylsiloxane-diphenylsiloxane copolymer having 33.3 mol percent diphenylsiloxane units and 66.7 mol percent monomethylsiloxane units with the acetoxy groups attached to the silicon atom of the monomethylsiloxane units, a mixture of 74.8 g. of a hydroxyl endblocked polyphenylmethylsiloxane having an average of 13 phenylmethylsiloxane units per molecule, 10 g. of a hydroxyl endblocked polydimethylsiloxane having an average of 34 dimethylsiloxane units per molecule and 40 g. of toluene were added and the resulting mixture was stirred for 20 minutes. The resulting product was a modified acetoxymonomethylsiloxane-diphenylsiloxane copolymer having polydiorganosiloxane segments linking molecules of the acetoxymonomethylsiloxane-diphenylsiloxane copolymer. The polydiorganosiloxane was a mixture of polyphenylmethylsiloxane in an amount of 8.5 weight percent based on the total weight of the modified acetoxymonomethylsiloxane-diphenylsiloxane copolymer and polydimethylsiloxane in an amount of 1.1 weight percent based on the total weight of the modified acetoxymonomethylsiloxane-diphenylsiloxane copolymer.

EXAMPLE 17

To 583 g. (2.65 moles) of methyltriacetoxysilane, 6.3 g. (0.35 mole) water were added dropwise over a 2 minute period. The temperature increased from 27° to 47°C. during the addition. The resulting mixture was stirred for 10 minutes and then 356 g. (1.65 moles) of diphenylsilanediol were added in a one minute period. The temperature increased from 34° to 64°C. during the addition. The resulting mixture was stirred for 30 minutes and then 68 g. of a hydroxyl endblocked polyphenylmethylsiloxane having an average of 12 phenylmethylsiloxane units per molecule and 14.7 g. of a hydroxyl endblocked polydimethylsiloxane having an average of 63 dimethylsiloxane units per molecule were added. The resulting mixture was stirred for 30 minutes and then vacuum stripped to 130°C. at 16 mm of Hg whereby 229 g. of volatiles were collected. The resulting product was a modified acetoxymonomethylsiloxane-diphenylsiloxane copolymer having polydiorganosiloxane segments linking molecules of the acetoxymonomethylsiloxane-diphenylsiloxane copolymer together. The polydiorganosiloxane was a mixture of polyphenylmethylsiloxane in an amount of 7.1 weight percent based on the total weight of the modified acetoxymonomethylsiloxane-diphenylsiloxane copolymer and and polydimethylsiloxane in an amount of 1.5 weight percent based on the total weight of the modified acetoxymonomesthylsiloxane-diphenylsiloxane copolymer.

EXAMPLE 18

When the following hydroxyl endblocked polydiorganosiloxanes are substituted for the hydroxyl endblocked polyphenylmethylsiloxane of Example 13, modified acetoxymonomethylsiloxane-diphenylsiloxane copolymers are obtained:

(A) 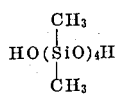

(B) 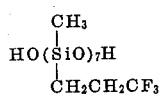

(C) 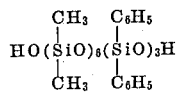

(D) 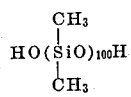

(E) 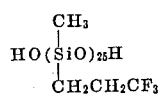

(F) 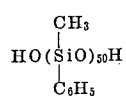

(G) 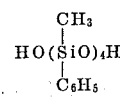

(H) 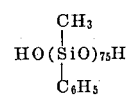

(I) 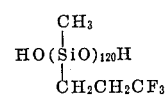

(J) 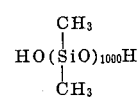

(K) 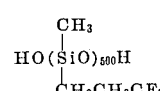

(L) 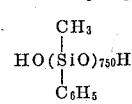

EXAMPLE 19

When diphenylsilanediol is added to methyltriacetoxysilane following the method of Example 13, the resulting product dissolved in enough toluene to make a 50 weight percent solution of the acetoxymonomethylsiloxane-diphenylsiloxane copolymer and then a hydroxyl endblocked polydiorganosiloxane is added to the total solution of acetoxymonomethylsiloxane-diphenylsiloxane copolymer and a modified acetoxymonomethylsiloxane-diphenylsiloxane copolymer is prepared according to the method of Example 13, the resulting modified acetoxymonomethylsiloxane-diphenylsiloxane copolymer described below is obtained when the following reactants are used in the amounts indicated.

A. 1,320 g. of methyltriacetoxysilane
864 g. of diphenylsilanediol
1704 g. of toluene

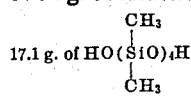

An acetoxymonomethylsiloxane-diphenylsiloxane copolymer having 60 mol percent monomethylsiloxane units and 40 mol percent diphenylsiloxane units with 34.6 weight percent acetoxy groups attached to the silicon atom of the monomethylsiloxane units modified with linking segments of

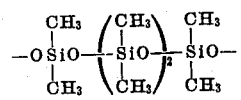

in an amount of 1 weight percent based on the weight of the modified copolymer is obtained.

B. 121.0 g. of methyltriacetoxysilane
107.2 g. of diphenylsilanediol
174.2 g. of toluene

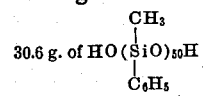

An acetoxymonomethylsiloxane-diphenylsiloxane copolymer having 55 mol percent monomethylsiloxane units and 45 mol percent diphenylsiloxane units with 25.4 weight percent acetoxy group attached to the silicon atom of the monomethylsiloxane units modified with linking segments of

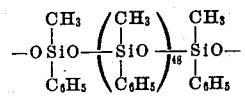

in an amount of 15 weight percent based on the weight of the modified copolymer is obtained.

C. 1,144.0 g. of methyltriacetoxysilane
1,036.8 g. of diphenylsilanediol
1,604.8 g. of toluene

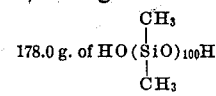

An acetoxymonomethylsiloxane-diphenylsiloxane copolymer having 52 mol percent monomethylsiloxane units and 48 mol percent diphenylsiloxane units with 21.4 weight percent acetoxy groups attached to the silicon atoms of the monomethylsiloxane units modified with linking segments of

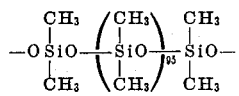

in an amount of 10 weight percent based on the weight of the modified copolymer is obtained.

D. 1,430.0 g. of methyltriacetoxysilane
747.0 g. of diphenylsilanediol
1,757.0 g. of toluene

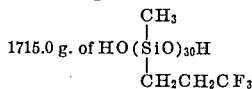

An acetoxymonomethylsiloxane-diphenylsiloxane copolymer having 65 mol percent monomethylsiloxane units and 35 mol percent diphenylsiloxane units with 41.9 weight percent acetoxy groups attached to the silicon atoms of the monomethylsiloxane units modified with linking segments of

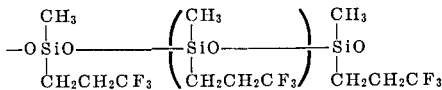

in an amount of 50 weight percent based on the weight of the modified copolymer is obtained.

That which is claimed is:

1. An acetoxymonomethylsiloxane-diphenylsiloxane copolymer which is modified consisting essentially of the acetoxymonomethylsiloxane-diphenylsiloxane copolymer which is an acetoxymonomethylsiloxane-diphenylsiloxane copolymer consisting essentially of organosiloxane units selected from the group consisting of

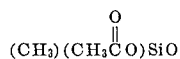

$CH_3SiO_{1.5}$, $(C_6H_5)_2SiO$ and

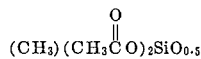

there being present per molecule at least 2 units of

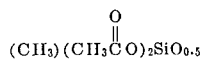

and at least one unit of $(C_6H_5)_2SiO$, at least 95 percent of the total number of $(C_6H_5)_2SiO$ units having each unsatisfied valence of each $(C_6H_5)_2SiO$ unit satisfied by a unit selected from the group consisting of

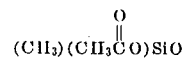

$CH_3SiO_{1.5}$ and

there being from 15 to 46 inclusive weight percent

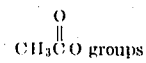

present in said acetoxymonomethylsiloxane-diphenylsiloxane copolymer based on the total weight of said acetoxymonomethylsiloxane-diphenylsiloxane copolymer and from 20 to 50 inclusive mol percent $(C_6H_5)_2SiO$ units based on the total number of siloxane units in said acetoxymonomethylsiloxane-diphenylsiloxane copolymer wherein acetoxymonomethylsiloxane-diphenylsiloxane copolymer molecules are linked together with segments consisting essentially of a diorganosiloxane of the formula

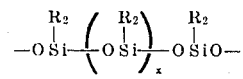

where each R is a monovalent radical selected from the group consisting of a methyl radical, a phenyl radical and a 3,3,3-trifluoropropyl radical, and $x$ has an average valve of at least 2, no more than 50 percent of the total number of R radicals being a 3,3,3-trifluoropropyl radicals, the terminal oxygen atoms of the segments being substituted for

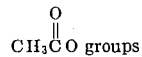

of the acetoxymonomethylsiloxane-diphenylsiloxane copolymer and said segments being present in an amount of from 1 to 50 weight percent based on the total weight of the modified acetoxymonomethylsiloxane-diphenylsiloxane copolymer.

2. The modified acetoxymonomethylsiloxane-diphenylsiloxane copolymer in accordance with claim 1 in which all the R are methyl radicals and $x$ is from 2 to 100 inclusive.

3. The modified acetoxymonomethylsiloxane-diphenylsiloxane copolymer in accordance with claim 2 in which the segments are present in an amount of from 1 to 10 weight percent.

4. The modified acetoxymonomethylsiloxane-diphenylsiloxane copolymer in accordance with claim 1 in which 50 percent of the total R are methyl radicals and 50 percent of the total R are phenyl radicals and $x$ is from 2 to 50 inclusive.

5. The modified acetoxymonomethylsiloxane-diphenylsiloxane copolymer in accordance with claim 2 in which the segments are present in an amount of from 15 to 30 weight percent.

* * * * *